UNITED STATES PATENT OFFICE.

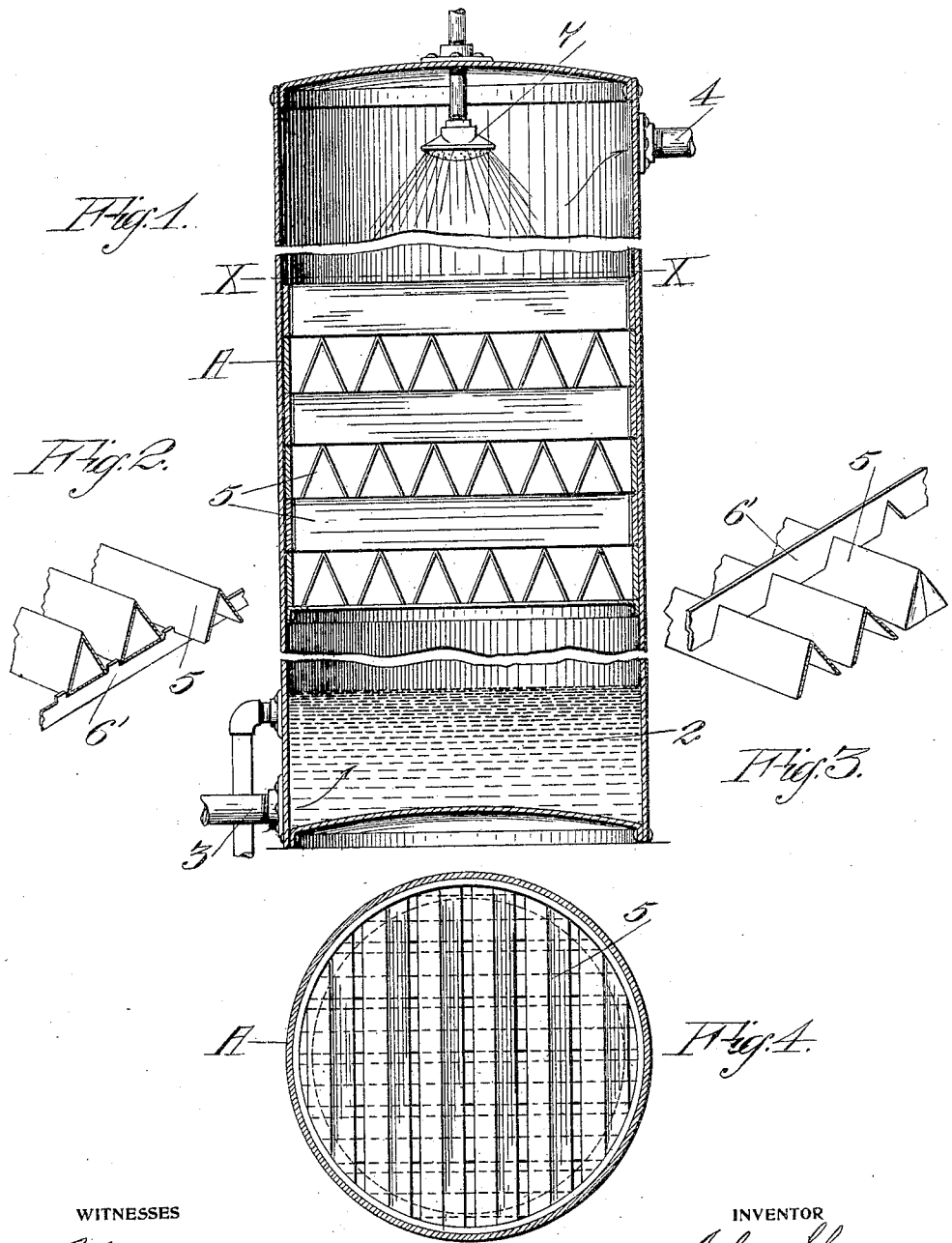

JOHN SHERMAN, OF GRASS VALLEY, CALIFORNIA.

GAS SCRUBBER AND WASHER.

No. 890,938.  Specification of Letters Patent.  Patented June 16, 1908.

Application filed March 18, 1908. Serial No. 421,787.

*To all whom it may concern:*

Be it known that I, JOHN SHERMAN, a citizen of the United States, residing at Grass Valley, in the county of Nevada and State of California, have invented new and useful Improvements in Gas Scrubbers and Washers, of which the following is a specification.

My invention relates to apparatus for scrubbing and washing illuminating or other gas.

The object of this invention is to provide an apparatus of this character which may be easily and cheaply manufactured and installed, which is permanent and practicable, which will reduce the quantity of water necessary over what is used under former processes, which will reduce the expenses of purifying, which will reduce the amount of oxids, which will eliminate the gas-fitter unstopping services, which will effect a saving on meter expenses, and in which apparatus there are no absorbent elements on which the heavy substances, such as tar and lamp-black, will cling, but which substances, on the other hand, will find their way to the bottom of the scrubber, from which they may be easily removed.

The invention consists of the parts and the construction and combination of parts as hereinafter more fully described and claimed, having reference to the accompanying drawings, in which—

Figure 1 is a longitudinal section. Fig. 2 shows one form of a spacing bar. Fig. 3 shows another form of a spacing bar. Fig. 4 is a section on line X—X, Fig. 1.

A represents a cylinder or tank of any suitable size, shape and material. The bottom of this tank or cylinder is adapted to contain a body of water, as 2.

3 is an inlet through which the gas is admitted to the cylinder through the body of water, and 4 is a gas outlet at the top of the tank.

The invention resides in arranging alternating series of A-shaped baffle or scrubber elements 5 within the cylinder in such fashion that the gas, in passing from the water to the outlet 4, will be required to travel in tortuous paths through and among the scrubbers, and the ascending gas will strike the hollow part of each individual scrubber element and collect therein the tar and lamp-black and other heavy substances, so that the gas which issues from the holder A will have been cleansed of practically all these heavy substances, and most of its other impurities. These baffles 5 are preferably made of sheet-metal, and closed at the ends, and are arranged in the form of trays, one disposed on top of the other, the baffles in one tray running at right angles to those immediately above and below. The baffles in each tray are suitably spaced apart to permit the free circulation of gas between them, and the baffles are so placed in the scrubber as to break joints, and cause the maximum circulation of the gas through these trays.

The baffles in one tray may be all connected together by a surrounding hoop or band, as shown in Fig. 1, for the purpose of maintaining them equidistant apart; or the individual baffle members, cut to proper length and closed at the ends, may be laid in loose and maintained at uniform distances apart by suitable means, as the notched spacing bars 6', Fig. 3.

Above the baffles is disposed a spray nozzle 7 adapted to discharge a spray down on top of the trays, and the water thus directed downward strikes the roof-like baffles composing the trays, dividing up the streams into numerous cascades through which the gas must pass upward. These various baffles divide the scrubber up in such a way as to cover every part of the cross-section of the scrubber, thus making every part of the water do its work, thereby saving a great deal of water, and affording additional cooling advantages, since the water cools the metal that the gas has to come in contact with, as well as cooling the gas itself.

When the trays are once installed they are practically indestructible, and therefore very economical of maintenance. They will last for years, since they require no attention, and do not have to be moved for cleaning; steam and hot water being all that is necessary thoroughly to clean them while in place.

The pitch of the baffles is such that the lampblack and other materials will not stick to them, but will drop through and be collected in the bottom of the tank. In fact, they make an ideal tar extractor, when properly set in sufficient quantity, and no tar will go over to stop up the service pipes and jets.

By the use of a scrubber of this construction it is possible to do away with the relief holder, since the gas is thoroughly cooled and ready for the purifiers as it is being made.

The cooling process is gradual, and is made perfect on account of the thorough circulation of both water and gas; this circulation avoiding streaks of hot gas and cold gas.

Having thus described my invention, what I claim and desire to secure by Letters Patent is—

1. A gas washer and scrubber comprising a casing having a gas inlet at the bottom and a gas outlet at the top, and a series of scrubbing trays in the casing between the inlet and outlet, said trays consisting of spaced A-shaped baffle members, the baffle members in one tray running transverse to the baffle members in the immediately succeeding tray, and means for discharging a water spray upon the trays.

2. A gas washer and scrubber comprising a casing having a gas inlet at the bottom and a gas outlet at the top, and a series of scrubbing trays in the casing between the inlet and outlet, said trays consisting of spaced A-shaped baffle members, the baffle members in one tray running transverse to the baffle members in the immediately succeeding tray, and the baffles which run in the same direction being laid in break joint courses, whereby the gas travels in circuitous path through the trays, and means for discharging a water spray upon the trays.

In testimony whereof I have hereunto set my hand in presence of two subscribing witnesses.

JOHN SHERMAN.

Witnesses:
   C. H. STAGER,
   DON C. RAY.